April 25, 1939.  A. GOTHE ET AL  2,155,652
ARRANGEMENT FOR COUPLING HIGH FREQUENCY CIRCUITS
Filed Sept. 20, 1932   2 Sheets-Sheet 1

INVENTOR
ALBRECHT GOTHE, HANS O. ROOSENSTEIN
LUDWIG WALTER
BY
ATTORNEY

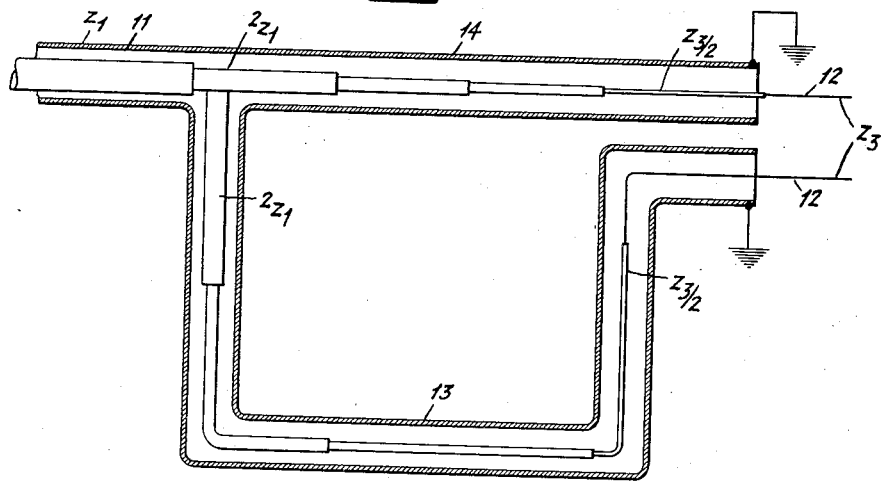
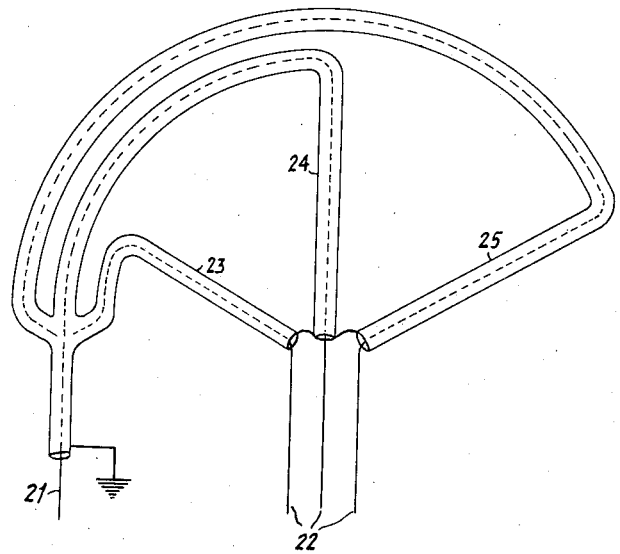

Patented Apr. 25, 1939

2,155,652

UNITED STATES PATENT OFFICE 2,155,652

ARRANGEMENT FOR COUPLING HIGH FREQUENCY CIRCUITS

Albrecht Gothe, Hans O. Roosenstein, and Ludwig Walter, Berlin, Germany, assignors to Telefunken Gesellschaft für Drahtlose Telegraphie m. b. H., Berlin, Germany, a corporation of Germany Application September 20, 1932, Serial No. 634,000
In Germany November 17, 1931

10 Claims. (Cl. 178—44)

The invention relates to an arrangement for electrically coupling a high frequency circuit which is unsymmetrical with respect to its ground connection with a circuit symmetrically arranged with respect to the ground. In this description the term symmetrical is used to indicate such a circuit that when there are $n$-current carrying points, the potentials against ground, displaced by $$\frac{360°}{n}$$

as to phase are equal such as, for instance, the two grid connections of a push pull tube; an $n$-phase conductor; a two wire circuit; a di-pole antenna. The term unsymmetric, on the other hand, is used to indicate a circuit whose terminals carry different potentials, or currents against ground which, for instance, occurs in a high frequency circuit of a tube arrangement being disposed between the grid and the grounded cathode, or in a concentric conductor or grounded antenna, etc.

The invention is further explained with reference to the accompanying drawings Figures 1 to 5 which show various modifications of the invention.

Figure 1:
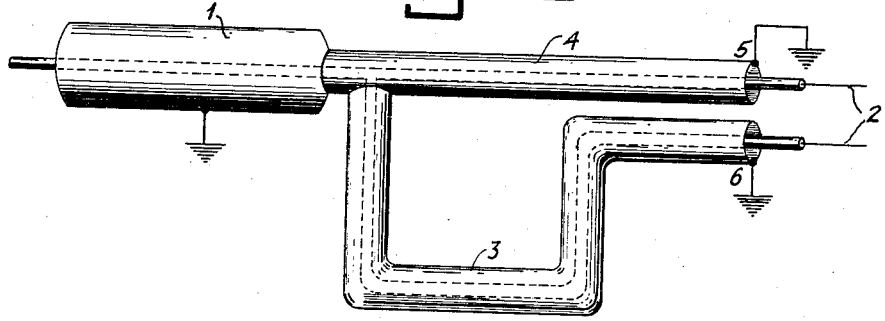

Figure 1 shows the coupling of a concentric conductor with a two wire conductor 2. In accordance with the present invention the concentric conductor 1 is branched into two lines 3 and 4, of which the outside conductors are grounded at the points 5 and 6 respectively, or they are only connected to each other. In order to avoid radiation it is necessary to arrange the two wire conductors 2 substantially symmetrical with respect to ground, and the currents on both wires are to be of equal intensity and in opposite phase. The opposition of the phases is obtained by a difference in length of the lines 3 and 4 equal to one half wave length. In view of the fact that the ends 5 and 6 of the transmission lines are connected to each other, potentials will appear at these end points of the inner conductors of the transmission lines, which are of equal magnitude with respect to the ground and of opposite phase. As a result of the ground connections at the points 5 and 6, in addition to the grounding of the outside conductor of 1, the potentials at all points of the outside tubes are equal to zero.

Figure 2:
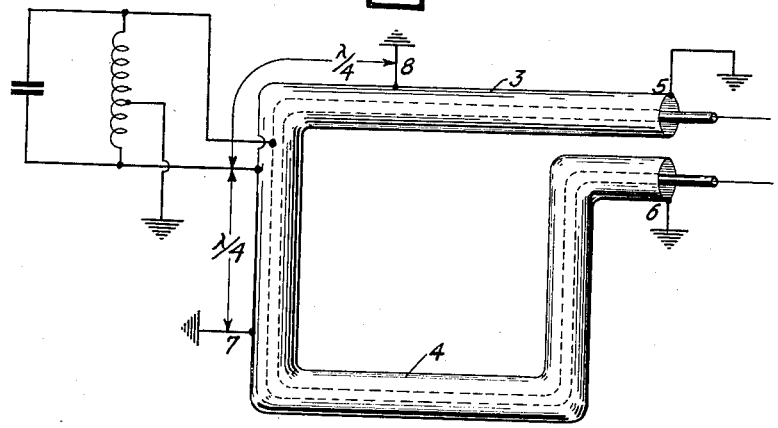

Figure 2 shows the coupling of an oscillatory circuit, which is not grounded at its exact electrical center, to a symmetric tubular conductor. If the ends 5 and 6 of the branch circuit in general were only grounded, there would result a reaction upon the potential distribution in the oscillatory circuit. In order to avoid such condition, the ground connections 5 and 6 at the outer conductor are disposed at a distance of an uneven (i. e., odd) number of quarter wave lengths from the connecting point of the oscillatory circuit. In the most favorable arrangement, each line 3, 4 is grounded once at a distance of one quarter wave length (at points 7, 8) from the connecting point to the high frequency circuit and also grounded at the ends 5, 6. The ground connection at a distance of one quarter wave length from the high frequency connecting point practically represents an infinitely large ground resistance, thus avoiding an effect upon the potential distribution of the oscillatory circuit.

Figure 3:
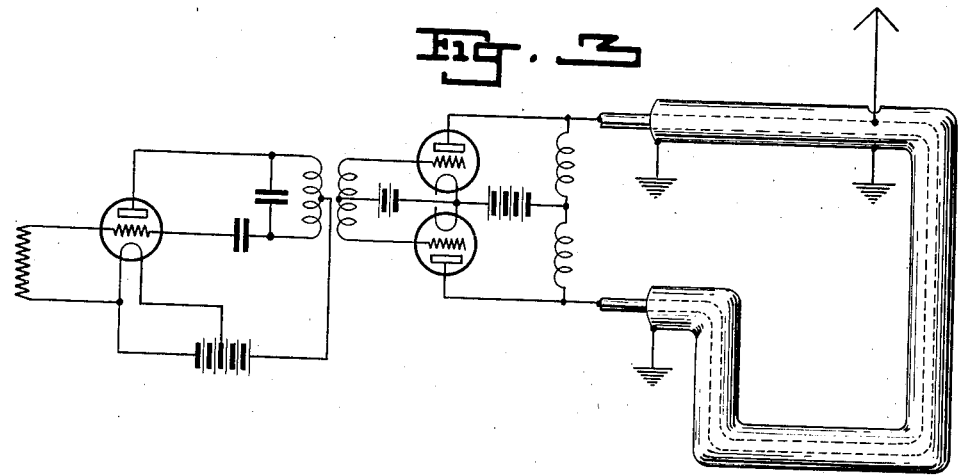

Figure 3 shows an application of the present invention for the coupling of an antenna with a push pull tube transmitter.

Known means may be provided in the circuit for the purpose of effecting an adaptation between the two coupled apparatus. Thus in Figure 4 the wave resistance (i. e., the surge impedance) of both transmission lines 13 and 14 is divided into small sections in the longitudinal direction, thereby avoiding reflections in the connecting points of these lines. The total variation of the wave resistance Z along the lines is chosen high enough so that the two lines, connected in parallel, represent at the branch point a resistance equal to the wave resistance (i. e., surge impedance) Z of the concentric conductor 11, whereas at the ends of lines 13 and 14 their wave resistances (surge impedances) are only one half of that of line 12, $Z_3$. If, as is herein assumed, the line 12 acts at its beginning like a resistance of the size of its wave resistance, reflections alongside the lines are avoided by the above described measures. In the event that the resistances, which are to be adapted to each other by the transmission lines 13 and 14, are very different, the length of the lines 13 and 14 should not be less than a definite amount. In regard to construction this does not represent a disadvantage. It must only be observed that the difference in length of the lines 13 and 14 must always represent an uneven number of half waves.

It will be evident that other known connections for effecting adapting can in a simple manner easily be applied which is within the scope of the present invention. A line of the length $$\frac{\lambda}{4}$$

and a wave resistance W and closed at the end by an ohmic resistance R, acts at the beginning like a resistance $r$ which is related to R and W in the manner seen from the equation $R \times r = W$.

In order to apply the transformer winding of such conductor parts in the sense of the present invention, the length of the lines 3 and 4 in Figure 1 must be an uneven number of quarter wave lengths. At the same time the difference in length of the lines must, as before, be an uneven number of half waves. In the present case let us assume by way of example that the length of the line 3 is $$3 \times \frac{\lambda}{4}$$

and the length of line 4 is $$\frac{\lambda}{4}$$

If $W_1$ is the wave resistance of line I, and $W_2$ the wave resistance of line 2, and if on these lines pure travelling waves should appear, then the load resistance of the right end of each of the lines 3 and 4 is $$\frac{W_2}{2}$$

while each of these lines must represent on their left ends a resistance $2 \times W_1$ in order that the substitution resistance of the transmission lines at this place will be $W_1$. Consequently the wave resistance $W_{3,4}$ of the lines 3, 4 will be determined by the equation:

$$W_{3,4} = \sqrt{2 \times W_1 \times \frac{W_2}{2}} = \sqrt{W_1 \times W_2}$$

If the line 2 is not entirely symmetrical with respect to the ground, the wave resistances of the lines 3 and 4 must accordingly be differently chosen. The assumed difference in length of an uneven number of quarter waves applies only to the condition at which the transmission lines transform ohmic resistances into new ohmic resistances. If, however, for instance, an inductive impedance should be adapted to an ohmic load with these lines, the length of the transmission lines must accordingly be chosen in a different manner. Such adapting devices may also be connected in series, spacially separate, with the symmetrical coupling circuit of the present invention.

The production of high frequency multiphase current from single phase current and vice versa, the production of single phase current from multiphase current is of importance for various purposes. In accordance with the present invention this can be accomplished in a simple manner with the arrangement shown in Figure 5. In this embodiment which shows the conversion of three phase current into single phase current, branched transmission lines 23, 24 and 25 are arranged in such manner that the difference in length between the lines 23 and 24 is $$\frac{\lambda}{3}$$

and that between the lines 23 and 25 is $$2 \times \frac{\lambda}{3}$$

In this case the ends of the outside conductors 23, 24, 25 are not grounded but are only connected to each other.

In the embodiments of the present invention the lines and their branches are arranged to be free from radiation and the desired displacements in phase are obtained by corresponding selection of their geometric lengths. The displacements in phase may of course also be obtained by correspondingly choosing the electrical length of the branch lines through the application of suitable phase shifting means, particularly for apparatus operating by long waves, in which case in order to render the conductors free from radiation it is not of primary necessity to apply Lecher wire systems or concentric tubular lines.

We claim:

1. In a high frequency coupling arrangement comprising a circuit which is normally unsymmetrical with respect to ground potential, a second circuit which is normally symmetrical with respect to ground potential, means for providing a symmetrical circuit coupling arrangement between said unsymmetrical and symmetrical circuits, said means comprising concentric conductors, at least one of said conductors being grounded to the unsymmetrical circuit portion at a distance from the connecting point of an uneven factor of a quarter wave, the conductors being connected at their ends to each other.

2. In a high frequency coupling arrangement, a three-phase circuit which is balanced with respect to ground, a circuit unbalanced with respect to ground, and three pairs of concentric conductors having respective electrical lengths of $$\lambda, \frac{\lambda}{3}, \text{ and } \frac{2\lambda}{3}$$

coupling said balanced three-phase circuit to said unbalanced circuit, the corresponding ends of said conductors located at the points of connection to said unbalanced circuit being connected together, where $\lambda$ is the length of the wave in said coupling arrangement.

3. In a high frequency transmission system, a multi-phase circuit substantially balanced with respect to ground, said balanced circuit having more than two terminals, a circuit unbalanced with respect to ground, and means coupling said circuits in energy transfer relation comprising a connection from a terminal in said balanced circuit to a point in said unbalanced circuit and connections from terminals of different phases in said balanced circuit to the same point in said unbalanced circuit, the electrical lengths of said connections differing by an amount sufficient to introduce the phase change required to maintain the electrical balance of said balanced circuit at the frequency of transmission, said connections comprising the inner conductors of individual coaxial lines.

4. In a high frequency transmission system, a circuit substantially balanced with respect to ground, a circuit unbalanced with respect to ground, and means coupling said circuits in energy transfer relation comprising a connection from a point in said balanced circuit to a point in said unbalanced circuit and a connection from a point of different phase in said balanced circuit to the same point in said unbalanced circuit, the electrical lengths of said connections differing by an amount sufficient to introduce the phase change required to maintain the electrical balance of said balanced circuit at the frequency of transmission, said connections comprising the inner conductors of individual coaxial lines, the ratio of inner diameter of outer conductor to the diameter of inner conductor of said coaxial lines being different at different points along the lengths thereof to effect a substantial impedance match between said two circuits, whereby standing waves on said lines are substantially avoided.

5. In a high frequency transmission system, a circuit substantially balanced with respect to ground, a circuit unbalanced with respect to ground, and means coupling said circuits in energy transfer relation comprising a connection from a point in said balanced circuit to a point in said unbalanced circuit and a connection from a point of different phase in said balanced circuit to the same point in said unbalanced circuit, the electrical lengths of said connections differing by an amount sufficient to introduce the phase change required to maintain the electrical balance of said balanced circuit at the frequency of transmission, said connections comprising the inner conductors of individual coaxial lines, the ratio of the inner diameter of the outer conductor to the diameter of the inner conductor of said coaxial lines at the point of connection to said unbalanced circuit being different from that at the points of connection to said balanced circuit, in order to effect a gradual change in impedance along the lengths of said coaxial lines, whereby standing waves on said lines are substantially avoided.

6. In a high frequency transmission system, a circuit unsymmetrical with respect to ground, a circuit symmetrical with respect to ground, and means coupling said circuits comprising connections from said unsymmetrical circuit to said symmetrical circuit, said connections constituting two pairs of concentric conductors, each of said pairs having an inner and an outer conductor, the electrical lengths of said pairs being substantially different by an amount such that the symmetry of said second-mentioned circuit is preserved, the ratio of the inner diameter of the outer conductor to the diameter of the inner conductor of said coaxial lines being greater at the points of connection to said symmetrical circuit than at the point of connection to said unsymmetrical circuit, in order to effect a gradual change in impedance along the lengths of said coaxial lines, whereby standing waves on said lines are substantially avoided.

7. In a high frequency transmission system, a single coaxial line unsymmetrical with respect to ground and having a surge impedance equal to $W_1$, a circuit symmetrical with respect to ground and having a surge impedance $W_2$, and means coupling said circuits comprising connections from said unsymmetrical circuit to said symmetrical circuit, said connections constituting two pairs of concentric conductors having a surge impedance equal to $$\sqrt{W_1 \times W_2}$$

8. In a high frequency system, means for coupling a circuit unbalanced with respect to ground to a circuit having $n$ conductors balanced with respect to ground, where $n$ is an integer greater than two, comprising $n$ coaxial lines, each of said $n$ coaxial lines differing in length from another of said lines by $$\frac{1}{n}$$

wavelength at the operating frequency, the outer conductors of said plurality of coaxial lines being grounded and connected together at one end, the inner conductors of said coaxial lines being connected at the other ends of said lines to said $n$ conductors of said balanced circuit.

9. In a high frequency coupling arrangement, a circuit which is balanced with respect to ground, a circuit unbalanced with respect to ground, and means coupling said circuits in energy transfer relation comprising a coaxial line extending from a point in said balanced circuit to a point in said unbalanced circuit and another coaxial line from a point of different phase in said balanced circuit to the same point in said unbalanced circuit, the electrical lengths of said connections differing by an amount sufficient to introduce the phase change required to maintain the electrical balance of said balanced circuit at the frequency of transmission, and a ground connection on each of the outer conductors of said coaxial lines at a point an odd integral multiple, including unity, of a quarter wavelength at the operating frequency from said point of connection in said unbalanced circuit.

10. In a high frequency transmission system, a three-phase balanced circuit, an unbalanced circuit, and means for coupling said circuits in energy transfer relation comprising three connections from the terminals of said balanced circuit to one side of said unbalanced circuit, two of said connections respectively differing in electrical length from said third connection by $$\frac{\lambda}{3} \text{ and } \frac{2\lambda}{3}$$

where $\lambda$ is the length of the wave in said transmission system.

ALBRECHT GOTHE.
HANS O. ROOSENSTEIN.
LUDWIG WALTER.